(12) United States Patent
Al Majid et al.

(10) Patent No.: US 11,604,819 B2
(45) Date of Patent: *Mar. 14, 2023

(54) ASSOCIATING A GRAPHICAL ELEMENT TO MEDIA CONTENT ITEM COLLECTIONS

(71) Applicant: Snap Inc., Santa Monica, CA (US)

(72) Inventors: Newar Husam Al Majid, New York, NY (US); Wisam Dakka, San Francisco, CA (US); Donald Giovannini, Venice, CA (US); Andre Madeira, Saratoga, CA (US); Andrei Damian, San Francisco, CA (US)

(73) Assignee: Snap Inc., Santa Monica, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 17/249,336

(22) Filed: Feb. 26, 2021

(65) Prior Publication Data

US 2021/0182331 A1 Jun. 17, 2021

Related U.S. Application Data

(63) Continuation of application No. 15/941,874, filed on Mar. 30, 2018, now Pat. No. 10,970,329.

(51) Int. Cl.
*G06F 16/48* (2019.01)
*G06F 16/51* (2019.01)
(Continued)

(52) U.S. Cl.
CPC ............ *G06F 16/48* (2019.01); *G06F 3/0236* (2013.01); *G06F 3/0237* (2013.01);
(Continued)

(58) Field of Classification Search
CPC ........ G06F 16/48; G06F 16/434; G06F 16/51; G06F 16/86; G06F 16/90324;
(Continued)

(56) References Cited

U.S. PATENT DOCUMENTS 10,387,574 B1 * 8/2019 Anders .................... G06F 40/44
10,416,846 B2 * 9/2019 Cassidy ................ G06F 40/274
(Continued)

OTHER PUBLICATIONS

"U.S. Appl. No. 15/941,874, Advisory Action dated Oct. 5, 2020", 3 pgs.

(Continued)

*Primary Examiner* — Dennis Truong
(74) *Attorney, Agent, or Firm* — Schwegman Lundberg & Woessner, P.A.

(57) ABSTRACT

Various embodiments provide for associating a collection of media items with a graphical element. For instance, a system can: generate corpus data from a set of features of a collection of media content items; determine a set of candidate graphical elements for the collection of media content items based on the corpus data and further based on a set of first mappings associating at least one graphical element and at least one n-gram; determine a set of prediction scores corresponding to the set of candidate graphical elements based on the set of features; determine a ranking for the set of candidate graphical elements based on the set of prediction stores; select a set of predicted graphical elements, from the set of candidate graphical elements, based on the ranking; and provide the set of predicted graphical elements in association with the collection of media content items.

20 Claims, 11 Drawing Sheets

(51) Int. Cl.
    *G06F 16/432*     (2019.01)
    *G06F 16/84*     (2019.01)
    *G06F 16/587*     (2019.01)
    *G06F 3/023*     (2006.01)
    *G06F 3/04895*     (2022.01)
    *G06F 3/04817*     (2022.01)
    *G06F 40/30*     (2020.01)
    *G06F 40/284*     (2020.01)
    *G06F 16/9032*     (2019.01)
    *H04M 1/72436*     (2021.01)

(52) U.S. Cl.
    CPC ........ *G06F 3/04895* (2013.01); *G06F 16/434* (2019.01); *G06F 16/51* (2019.01); *G06F 16/86* (2019.01); *G06F 16/90324* (2019.01); *G06F 40/30* (2020.01); *G06F 3/04817* (2013.01); *H04M 1/72436* (2021.01)

(58) Field of Classification Search
    CPC .... G06F 16/587; G06F 3/0236; G06F 3/0237; G06F 3/04895; G06F 3/04817; G06F 40/284; G06F 40/30; H04M 1/72436; H04M 1/7243; H04N 21/4788
    See application file for complete search history.

(56) References Cited

U.S. PATENT DOCUMENTS

| | | | |
|---|---|---|---|
| 2003/0076322 A1* | 4/2003 | Ouzts | G06F 3/04817 345/440 |
| 2007/0067225 A1* | 3/2007 | Fabris | G06Q 10/02 705/27.1 |
| 2007/0094056 A1* | 4/2007 | Kang | G06Q 10/02 705/5 |
| 2009/0234710 A1* | 9/2009 | Belgaied Hassine | G06Q 30/0201 705/7.29 |
| 2013/0339983 A1* | 12/2013 | Dai | G06F 9/451 719/318 |
| 2014/0114643 A1* | 4/2014 | Baker | G06T 11/60 704/9 |
| 2014/0156762 A1* | 6/2014 | Yuen | H04L 51/10 709/206 |
| 2014/0161356 A1* | 6/2014 | Tesch | H04L 51/063 382/196 |
| 2014/0278671 A1* | 9/2014 | Leonhardt | G06Q 10/1095 705/7.19 |
| 2015/0095020 A1* | 4/2015 | Leydon | G06F 3/04812 704/9 |
| 2015/0100537 A1* | 4/2015 | Grieves | G06N 5/025 706/52 |
| 2015/0286371 A1* | 10/2015 | Degani | G06F 40/253 715/835 |
| 2016/0210963 A1* | 7/2016 | Kim | G10L 15/1822 |
| 2016/0292148 A1* | 10/2016 | Aley | G06F 40/274 |
| 2017/0052946 A1* | 2/2017 | Gu | H04L 51/046 |
| 2017/0098122 A1* | 4/2017 | el Kaliouby | G16H 50/70 |
| 2017/0147696 A1* | 5/2017 | Evnine | G06F 16/9535 |
| 2017/0177589 A1* | 6/2017 | Shorman | H04L 51/214 |
| 2017/0185580 A1* | 6/2017 | Zhang | G06T 11/00 |
| 2017/0185581 A1* | 6/2017 | Bojja | G06F 16/353 |
| 2017/0337209 A1* | 11/2017 | Schaer | G06F 3/0482 |
| 2018/0054405 A1* | 2/2018 | Ritch | G06F 16/48 |
| 2018/0107650 A1* | 4/2018 | Calvo | G06F 40/279 |
| 2018/0136794 A1* | 5/2018 | Cassidy | G06F 3/0482 |
| 2018/0260385 A1* | 9/2018 | Fan | G06F 40/30 |
| 2018/0336184 A1* | 11/2018 | Bellegarda | G06F 40/30 |
| 2018/0356957 A1* | 12/2018 | Desjardins | G06F 9/451 |
| 2019/0197102 A1* | 6/2019 | Lerner | G06F 3/04817 |
| 2019/0340206 A1* | 11/2019 | Evnine | G06F 16/9536 |

OTHER PUBLICATIONS

"U.S. Appl. No. 15/941,874, Examiner Interview Summary dated Sep. 14, 2020", 3 pgs.
"U.S. Appl. No. 15/941,874, Final Office Action dated Jul. 14, 2020", 17 pgs.
"U.S. Appl. No. 15/941,874, Non Final Office Action dated Feb. 3, 2020", 13 pgs.
"U.S. Appl. No. 15/941,874, Notice of Allowance dated Nov. 27, 2020", 8 pgs.
"U.S. Appl. No. 15/941,874, Response filed May 4, 2020 to Non Final Office Action dated Feb. 3, 2020", 14 pgs.
"U.S. Appl. No. 15/941,874, Response filed Sep. 14, 2020 to Final Office Action dated Jul. 14, 2020", 12 pgs.
"Surprise!", [Online] Retrieved from the Internet: <URL: https://www.snap.com/en-us/news/post/surprise>, (Oct. 3, 2013), 1 pg.
Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.
Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.
Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.
U.S. Appl. No. 15/941,874, filed Mar. 30, 2018, Associating a Graphical Element to Media Content Item Collections.

* cited by examiner

US 11,604,819 B2

ASSOCIATING A GRAPHICAL ELEMENT TO MEDIA CONTENT ITEM COLLECTIONS

CLAIM OF PRIORITY

This application is a continuation of U.S. patent application Ser. No. 15/941,874, filed on Mar. 30, 2018, which is incorporated herein by reference in its entirety.

TECHNICAL FIELD

Embodiments described herein relate to media content and, more particularly, but not by way of limitation, to systems, methods, devices, and instructions for associating a collection of media content items with a graphical element.

BACKGROUND

Mobile devices, such as smartphones, are often used to generate media content items that can include, without limitation, text messages (e.g., that include emojis or emoticons), digital images (e.g., photographs), videos, and animations. Messages can be organized into a collection (e.g., gallery) of messages, which an individual can share with other individuals over a network, such as through a social network.

BRIEF DESCRIPTION OF THE DRAWINGS

Various ones of the appended drawings merely illustrate some embodiments of the present disclosure and should not be considered as limiting its scope. The drawings are not necessarily drawn to scale. To easily identify the discussion of any particular element or act, the most significant digit or digits in a reference number refer to the figure number in which that element is first introduced, and like numerals may describe similar components in different views.

DETAILED DESCRIPTION

Figure 1:
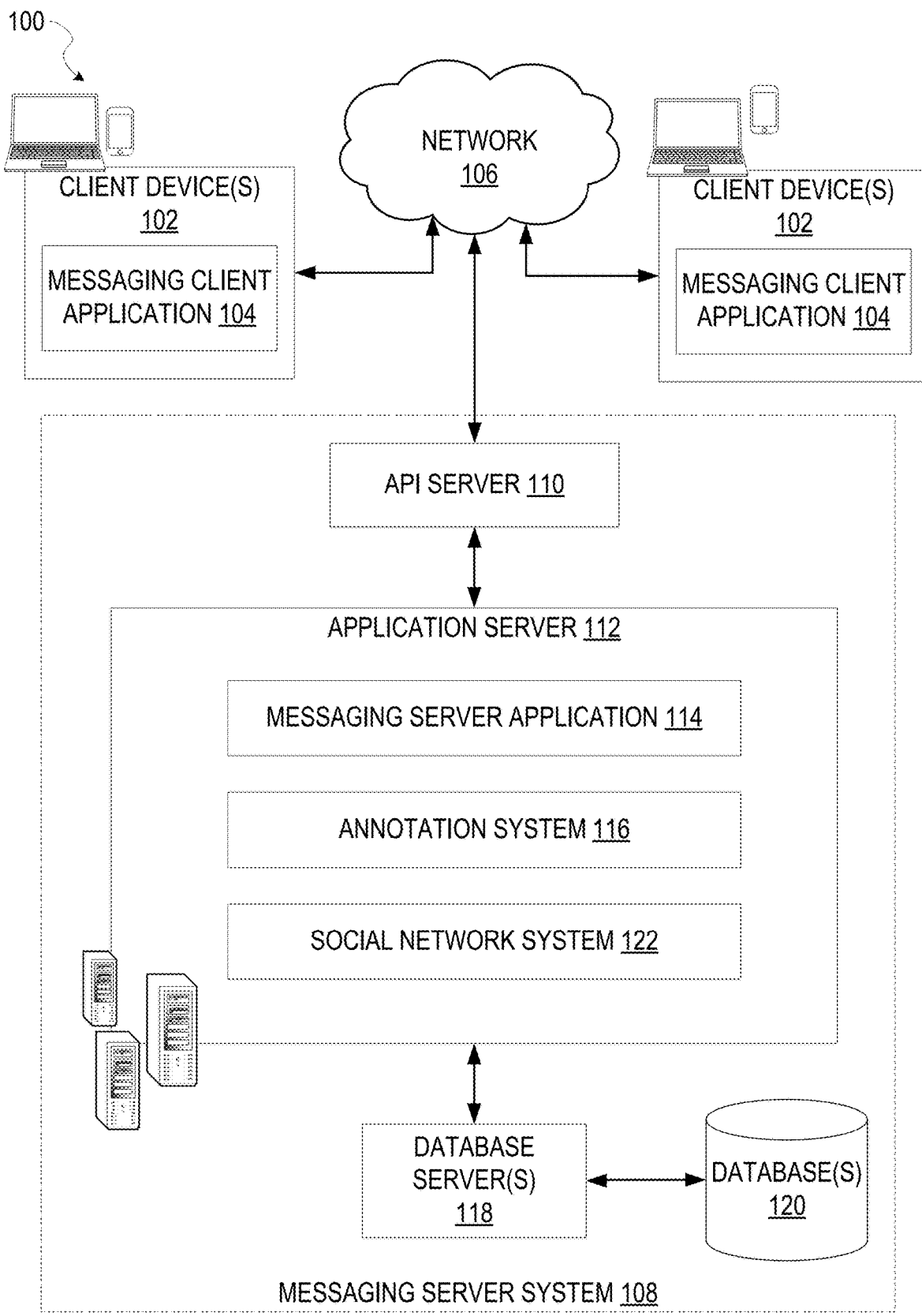
FIG. 1 is a block diagram showing an example messaging system, for exchanging data (e.g., messages and associated content) over a network, that can include a graphical element-to-collection association system according to some embodiments.

Various embodiments provide systems, methods, devices, and instructions for automatically associating a collection of media items with a graphical element, such as an emoji or an emoticon. In particular, some embodiments predict (or infer) one or more graphical elements for association with a collection of media content items based on features (or signals) of the collection (e.g., associated captions, visual labels, geographical location, category, event, graphical elements etc.). One or more features of a collection may be those features automatically determined for the collection during the collection's automatic generation (e.g., based on various factors or concepts, such as topics, events, places, celebrities, space/time proximity, media sources, or breaking news) or may be those features determined by an annotation process performed on the collection after its creation (e.g., where the collection is user created). The predicted graphical elements can be associated with the collection and, subsequently, provided in connection with the collection or used to facilitate a search for collections based on graphical elements. For instance, one or more of the predicted graphical elements may be presented to a user in connection with the collection of the media content items, (e.g., through a graphical user interface (GUI) accessible to the user at a client device). Various embodiments described herein can overcome the challenges of determining the relevance of graphical elements to collections of media items when graphical elements are automatically associated with the collections; determining the relevance of graphical elements to collections of media items can be difficult given that certain graphical elements (e.g., emojis) may have connections with a collection that are based on more than what those certain graphical elements depict or explicitly represent. Some such embodiments can enable or improve a computing device's ability to predict an association between a collection of media items with a graphical element.

According to some embodiments, a system generates corpus data from a set of features of a collection of media content items. The system determines a set of candidate graphical elements for the collection of media content items based on the corpus data and further based on a set of first mappings associating at least one graphical element and at least one n-gram (e.g., term-to-emoji or term-to-emoticon mapping). The system determines a set of prediction (or inference) scores corresponding to the set of candidate graphical elements based on the set of features. The system determines a ranking for the set of candidate graphical elements based on the set of prediction stores. The system selects a set of predicted (or inferred) graphical elements, from the set of candidate graphical elements, based on the ranking. Eventually, the system provides the set of predicted graphical elements in association with the collection of media content items. Alternatively or additionally, the system stores an association between the set of predicted graphical elements and the collection of media content items, which can facilitate future retrieval or use during other operations, such as searching for collections based on one or more graphical elements (e.g., provided in a search query by a user at a client device).

As used herein, a graphical element can include, without limitation, an emoji, an emoticon, an icon, or the like. An emoticon may comprise a pictograph, which may be defined as an extension to a text character set used in a writing system. For instance, an emoticon may be a pictograph as defined by the Unicode standard or the Universal Coded Character Set (UCS). Example emoticons are illustrated with respect to FIG. 7. An emoticon may comprise a typographic display of a facial representation using text characters (e.g., ":-)" or ";-)"). Various embodiments are described with respect to emojis for illustrative purposes and should not be construed as limiting use of other types of graphical elements by some embodiments.

As also used herein, an n-gram may include a unigram, a bigram, or a trigram. Example n-grams may include, without limitation, a word (e.g., keyword), a term, or a phrase.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example messaging system 100, for exchanging data (e.g., messages and associated content) over a network 106, that can include a graphical element-to-collection association system, according to some embodiments. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 can communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., digital images or video) from a messaging client application 104 to the messaging server application 114, and for possible access by another messaging client application 104; the setting of a collection of media content items (e.g., story), the retrieval of a list of friends of a user of a client device 102; the retrieval of such collections; the retrieval of messages and content, the adding and deletion of friends to a social graph; the location of friends within a social graph; and opening an application event (e.g., relating to the messaging client application 104).

The application server 112 hosts a number of applications, systems, and subsystems, including a messaging server application 114, an annotation system 116, and a social network system 122. The messaging server application 114 implements a number of message processing technologies and functions, particularly related to the aggregation and other processing of media content items (e.g., textual and multimedia content items) included in messages received from multiple instances of the messaging client application 104. As will be described herein, media content items from multiple sources may be aggregated into collections of media content items (e.g., stories or galleries), which may be automatically annotated by various embodiments described herein. For example, the collections of media content items can be annotated by associating the collections with captions, geographic locations, categories, events, highlight media content items, and the like. The collections of media content items can be made available for access, by the messaging server application 114, to the messaging client application 104. Other processor- and memory-intensive processing of data may also be performed server-side by the messaging server application 114, in view of the hardware requirements for such processing.

For a given a collection of media content, one or more annotations of the given collection may represent features of the given collection, and those features may include one or more graphical elements (e.g., emojis or emoticons) that various embodiments described herein may be use when automatically associating one or more graphical elements with the given collection. Access to the given collection of media content items may include access to one or more of annotations of the given collection and one or more graphical elements associated with the given collection by various embodiments described herein.

The application server 112 also includes an annotation system 116 that is dedicated to performing various image processing operations, typically with respect to digital images or video received within the payload of a message at the messaging server application 114.

The social network system 122 supports various social networking functions and services, and makes these functions and services available to the messaging server application 114. To this end, the social network system 122 maintains and accesses an entity graph 304 (FIG. 3) within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages (e.g., collections of messages) processed by the messaging server application 114.

Figure 2:
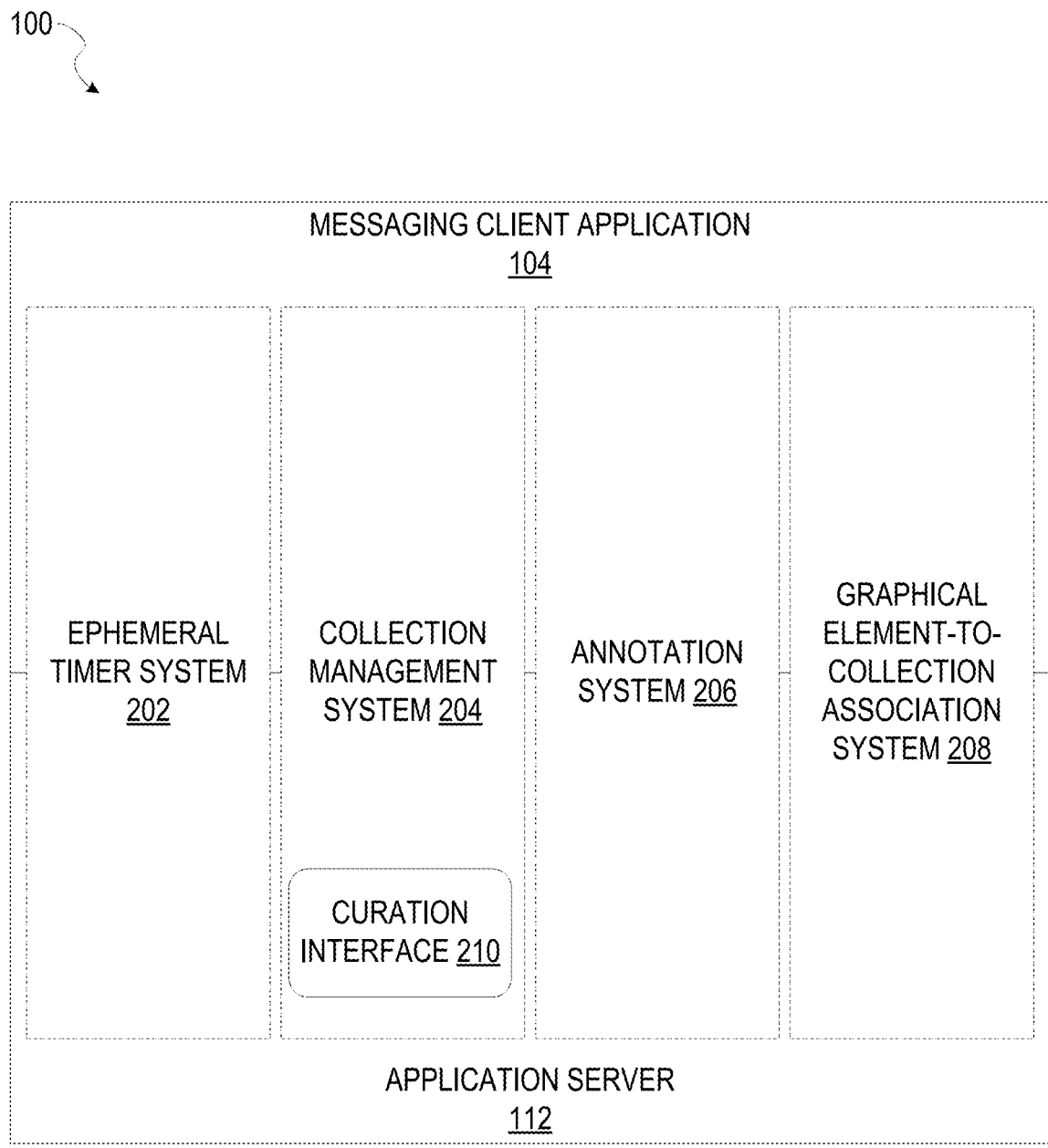
FIG. 2 is block diagram illustrating further details regarding a messaging system that includes a graphical element-to-collection association system, according to some embodiments.

FIG. 2 is block diagram illustrating further details regarding the messaging system 100 that includes a graphical element-to-collection association system 208, according to some embodiments. Specifically, the messaging system 100 is shown to comprise the messaging client application 104 and the application server 112, which in turn embody a number of some subsystems, namely an ephemeral timer system 202, a collection management system 204, an annotation system 206, the graphical element-to-collection association system 208.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media content items (e.g., collections of text, image, video, and audio data), which may be initially user curated or automatically generated based on various factors or concepts (e.g., topics, events, places, celebrities, space/time proximity, media sources, breaking news, etc.) and then annotated as described herein. In some examples, a collection of media content items (e.g., messages, including digital images, video, text, and audio) may be organized into a "gallery," such as an "event gallery" or an "event story." Such a collection may be made available for a specified time period, such as the duration of an event to which the media content items relate. For example, media content items relating to a music concert may be made available as a "story" for the duration of that music concert. The collection management system 204 may also be responsible for publishing an icon that provides notification of the existence of a particular collection to the user interface of the messaging client application 104. According to some embodiments, the icon comprises one or more media content items from the collection that are identified as highlight media content items for the collection as described herein.

The collection management system 204 furthermore includes a curation interface 210 that allows a collection manager to manage and curate a particular collection of media content items. For example, the curation interface 210 enables an event organizer to curate a collection of media content items relating to a specific event (e.g., delete inappropriate media content items or redundant messages). Additionally, the collection management system 204 employs machine vision (or image recognition technology) and media content item rules to automatically curate a media content item collection. In certain embodiments, compensation may be paid to a user for inclusion of user-generated media content items into a collection. In such cases, the curation interface 210 operates to automatically make payments to such users for the use of their media content items.

The annotation system 206 determines and associates one or more annotations for a collection of media content items. Annotations that may be determined for the collection of media content items can include, without limitation, a caption, a geographic location, a category, an event, and a highlight media content item (e.g., for representing the collection). According to various embodiments, one or more of the annotations determined by the annotation system 206 are used by the graphical element-to-collection association system 208 as features of a given collection of media content items that the graphical element-to-collection association system 208 uses for determining and associating one or more graphical elements with the given collection. The annotation system 206 may determine a particular caption for a plurality of media content items by selecting the particular caption from a set of captions, where the set of captions being extracted from the plurality of media content items. The annotation system 206 may determine a particular geographic location for the plurality of media content items. The annotation system 206 may determine a particular category for the plurality of media content items based on at least one of analysis of a set of visual labels identified for the plurality of media content items or analysis of at least one caption in the set of captions. The annotation system 206 may generate a collection of media content items that comprises the plurality of media content items and collection annotation data that at least associates the collection with the particular caption, with the particular geographic location, and with the particular category. Alternatively or additionally, the annotation system 206 may associate user-specified annotations with a collection (e.g., annotations a user provides for, or applies to a collection, through a client device 102). Eventually, when a collection of media content items is provided for access by a client device associated with a user, annotations determined for the collection may also be provided with the collection. For instance, one or more of the predicted graphical elements may be presented to a user in connection with the collection of the media content items through a graphical user interface (GUI) accessible to the user at a client device.

The graphical element-to-collection association system 208 automatically associates one or more graphical elements with a collection of media content items. The graphical element-to-collection association system 208 may do so by predicting the one or more graphical elements for the collection of media content items based on features of the collection (e.g., associated captions, visual labels, geographical location, category, event, etc.). One or more features of a collection may be those features automatically determined for the collection during the collection's automatic generation (e.g., based on various factors or concepts, such as topics, events, places, celebrities, space/time proximity, media sources, or breaking news) or may be those features determined by an annotation process performed on the collection after its creation (e.g., where the collection is user created).

According to some embodiments, the graphical element-to-collection association system 208 associates one or more graphical elements with a collection of media content items by generating corpus data from a set of features of a collection of media content items. The graphical element-to-collection association system 208 then determines a set of candidate graphical elements for the collection of media content items based on the corpus data and further based on at least one graphical element mapping. Example graphical element mappings can include, without limitation, mappings between a graphical element (e.g., emoji) and an n-gram (e.g., word, term or phrase), mappings between two or more different graphical elements (e.g., mapping an emoji to one or more synonym emoji), and canonical mappings between a graphical element and a collection of media content items (e.g., based on a category associated with the collection). A graphical element mapping used by the graphical element-to-collection association system 208 may be one generated by the graphical element-to-collection association system 208 or another system. Once generated, a graphical element mapping may be stored in a data structure, such as a database table. The generation of one or more graphical element mappings may be performed as part of a pre-processing stage of the graphical element-to-collection association system 208, where association of a new collection to one or more predicted graphical elements is performed as part of a processing stage of the graphical element-to-collection association system 208.

Generation of graphical element mappings may be based on mining various data sources. For instance, a mapping between a graphical element and a n-gram may be generated by analyzing co-occurrences of graphical elements with n-grams in other collections (e.g., determining which emojis commonly co-occur with terms across prior collections by a normalized pointwise mutual information (NPMI) algorithm), or by mining for mapping between a graphical element and an n-gram by analyzing standard descriptions of graphical elements provided by a character set standard (e.g., Unicode standard description of emojis). A mapping between two or more graphical elements (e.g., two or more emojis) may be generated by analyzing mappings between graphical elements and n-grams to identify synonym graphical elements (e.g., synonym emojis). A canonical mapping between a graphical element and a collection category may be manually established (e.g., by one or more human individuals) based on analysis or observation of prior collections (e.g., observing that a particular graphical element represents a particular collection category well).

Subsequently, the graphical element-to-collection association system 208 then determines a set of prediction scores corresponding to the set of candidate graphical elements based on the set of features. The graphical element-to-collection association system 208 determines a ranking for the set of candidate graphical elements based on the set of prediction stores. The graphical element-to-collection association system 208 selects a set of predicted graphical elements, from the set of candidate graphical elements, based on the ranking.

The graphical element-to-collection association system 208 can then provide the set of predicted graphical elements in association with the collection of media content items. Alternatively or additionally, the graphical element-to-collection association system 208 may store an association between the collection and the set of predicted graphical elements (e.g., store the association in the annotation table 312 or the story table 306 in connection with a collection of messages). The stored association can be subsequently retrieved and used for other operations, such as searching for collections based on one or more graphical elements (e.g., provided in a search query by a user at a client device 102).

For some embodiments, graphical element predictions (or inferences) by the graphical element-to-collection association system 208 are evaluated and the graphical element-to-collection association system 208 tuned based on the evaluation. In this way, the graphical element-to-collection association system 208 can maximize a graphical element (e.g., emoji) to collection (e.g., story) relevance metric to tune the graphical element-to-collection association system 208. For instance, the graphical element-to-collection association system 208 may be tuned via a manual evaluation by a human individual (e.g., trained human curator) at a client device. The human individual may be presented with a given collection of media content items as a sequence of captions and with one or more graphical elements (e.g., emojis) extracted from the collection, which the human individual can then review. The human individual may mark or otherwise designate whether a particular extracted graphical element is relevant to the given collection (e.g., on a three-point scale of not relevant, relevant, or highly relevant). Based on this relevancy evaluation, the graphical element-to-collection association system 208 can modify the weights (e.g., representing an emoji-to-collection relevance) used by the graphical element-to-collection association system 208 when determining one or more prediction scores for candidate graphical elements. This, in turn, can improve the graphical element-to-collection association system 208's ability (e.g., precision and recall of relevant graphical element associations) to predict graphical elements in the future.

Figure 3:
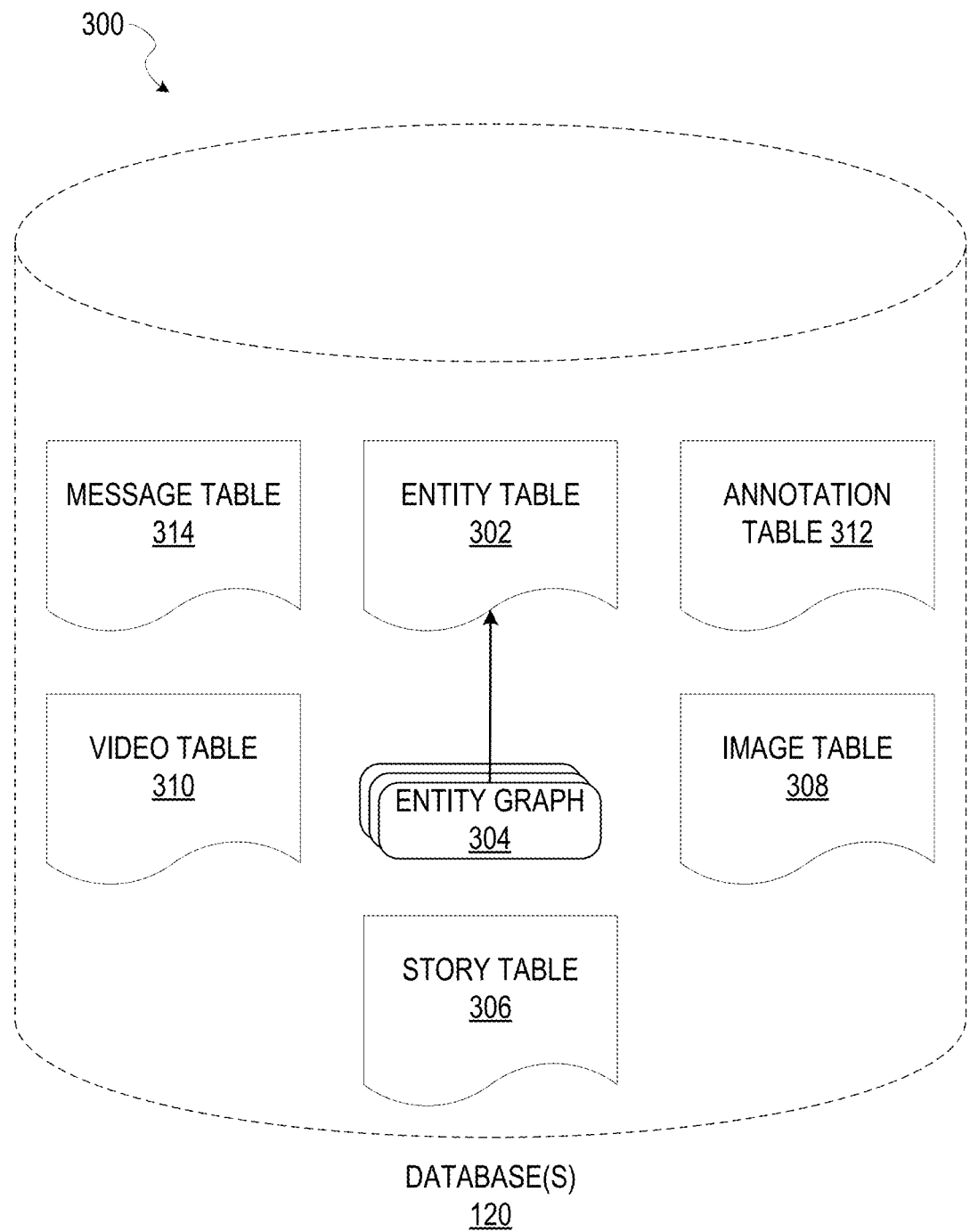
FIG. 3 is a schematic diagram illustrating data which may be stored in the database of the messaging system, according to some embodiments.

FIG. 3 is a schematic diagram illustrating data 300 which may be stored in the database 120 of the messaging server system 108, according to certain embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interest-based or activity-based, merely for example.

In an annotation table 312, the database 120 also stores annotation data, such as annotations applied to a message or a collection of media content items. As described herein, annotations applied to a collection of media content items can include, without limitation, a caption (e.g., single word or phrase), a geographic location, a category, an event (e.g., periodic event, ongoing event, or concluded event), and a highlight media content item (e.g., for representing the collection). Annotations applied to a message may include, for example, filters, media overlays, texture fills and sample digital images. Filters, media overlays, texture fills, and sample digital images for which data is stored within the annotation table 312 are associated with and applied to videos (for which data is stored in a video table 310) or digital images (for which data is stored in an image table 308). In one example, an image overlay can be displayed as overlaid on a digital image or video during presentation to a recipient user. For example, a user may append a media overlay on a selected portion of the digital image, resulting in presentation of an annotated digital image that includes the media overlay over the selected portion of the digital image. In this way, a media overlay can be used, for example, as a digital sticker or a texture fill that a user can use to annotate or otherwise enhance a digital image, which may be captured by a user (e.g., photograph).

Filters may be of various types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection of media content items (e.g., a story or a gallery). The creation of a particular collection may be initiated by a particular user (e.g., each user for which a record is maintained in the entity table 302) or automatically generated based on various factors or concepts (e.g., topics, events, places, celebrities, space/time proximity, media sources, breaking news, etc.). A user may create a "personal story" in the form of a collection of media content items that has been created and sent/broadcast by that user. To this end, the user interface of the messaging client application 104 may include an icon that is user-selectable to enable a sending user to add a specific media content item to his or her personal story.

A collection may also constitute a "live story," which is a collection of media content items from multiple users that is created manually, automatically, or using a combination of manual and automatic techniques. For example, a "live story" may constitute a curated stream of user-submitted media content items from various locations and events. Users whose client devices have location services enabled and are at a common location or event at a particular time may, for example, be presented with an option, via a user interface of the messaging client application 104, to contribute media content items to a particular live story. The live story may be identified to the user by the messaging client application 104, based on his or her location. The end result is a "live story" told from a community perspective.

A further type of media content item collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
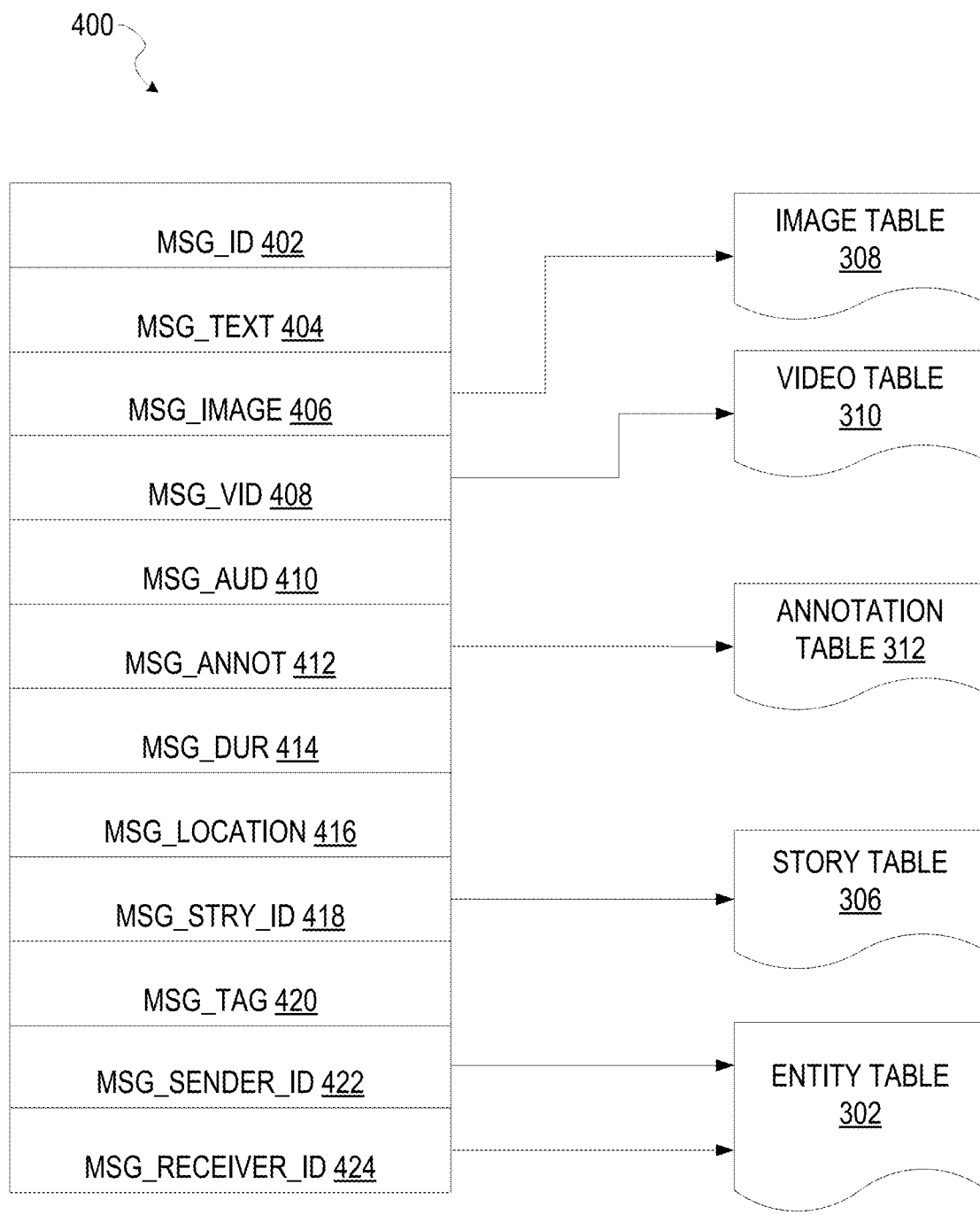
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from memory of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from the memory component of the client device 102, and that is included in the message 400.
- A message annotation 412: annotation data (e.g., filters, stickers, texture fills, or other enhancements) that represents annotations to be applied to message image payload 406, message video payload 408, or message audio payload 410 of the message 400.
- A message duration parameter 414: a parameter value indicating, in seconds, the amount of time for which content of the message 400 (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, each of these parameter values being associated with respect to media content items included in the content (e.g., a specific image within the message image payload 406, or a specific video in the message video payload 408).

A message story identifier 418: identifier values identifying one or more media content item collections (e.g., "stories") with which a particular media content item in the message image payload 406 of the message 400 is associated. For example, multiple images within the message image payload 406 may each be associated with multiple media content item collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
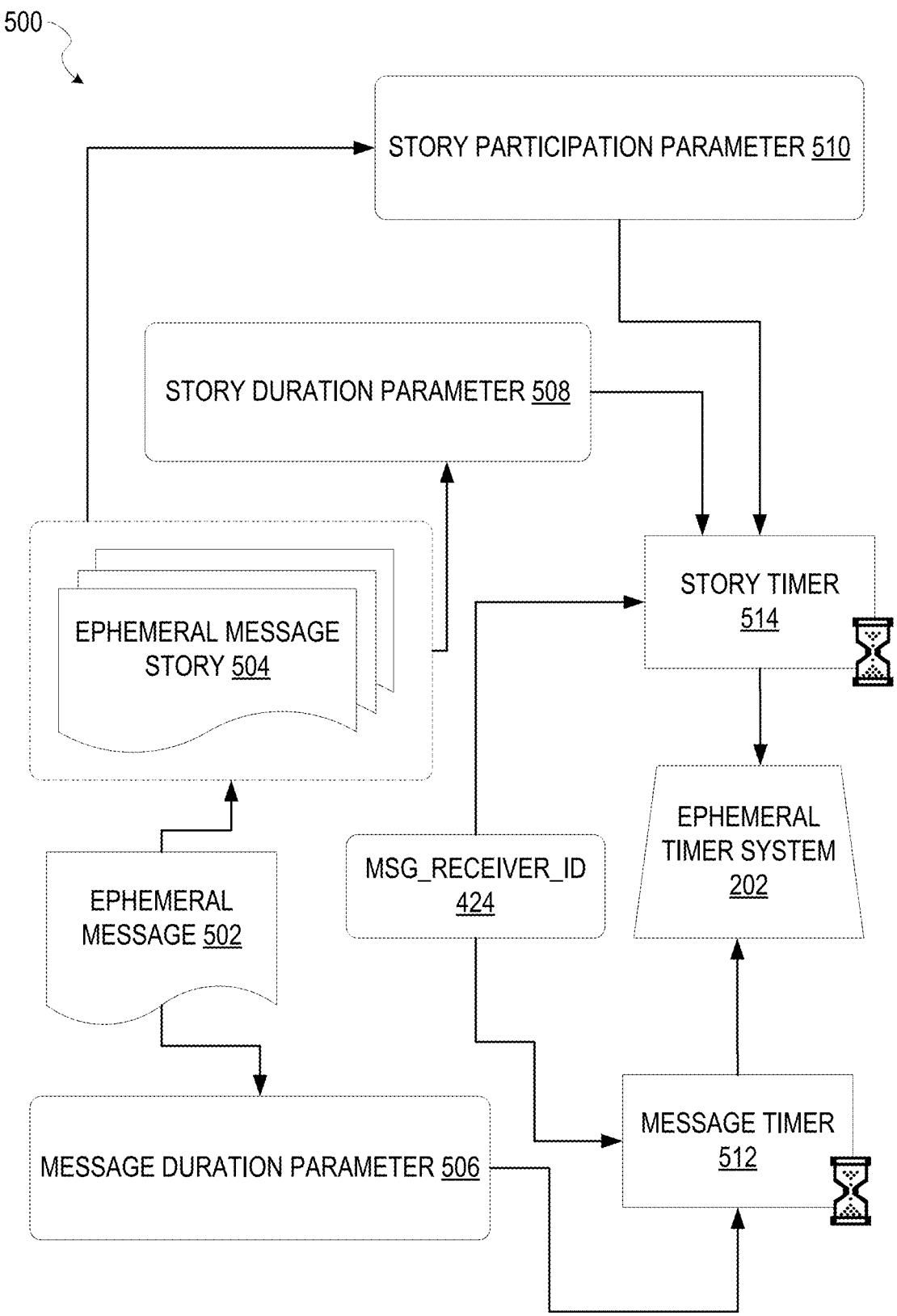
FIG. 5 is a schematic diagram illustrating an example access-limiting process, in terms of which access to media content item (e.g., an ephemeral message and associated multimedia payload of data) or a media content item collection (e.g., an ephemeral message story) may be time-limited (e.g., made ephemeral).

FIG. 5 is a schematic diagram illustrating an access-limiting process 500, in terms of which access to a media content item (e.g., an ephemeral message 502, and associated multimedia payload of data) or a media content item collection (e.g., an ephemeral message story 504) may be time-limited (e.g., made ephemeral). Though the access-limiting process 500 is described below with respect to the ephemeral message 502 and the ephemeral message story 504, for the access-limiting process 500 can be applied to another type of media content item or collection of media content items, such as a collection of media content items associated with one or more graphical elements by an embodiment described herein.

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of media content items pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
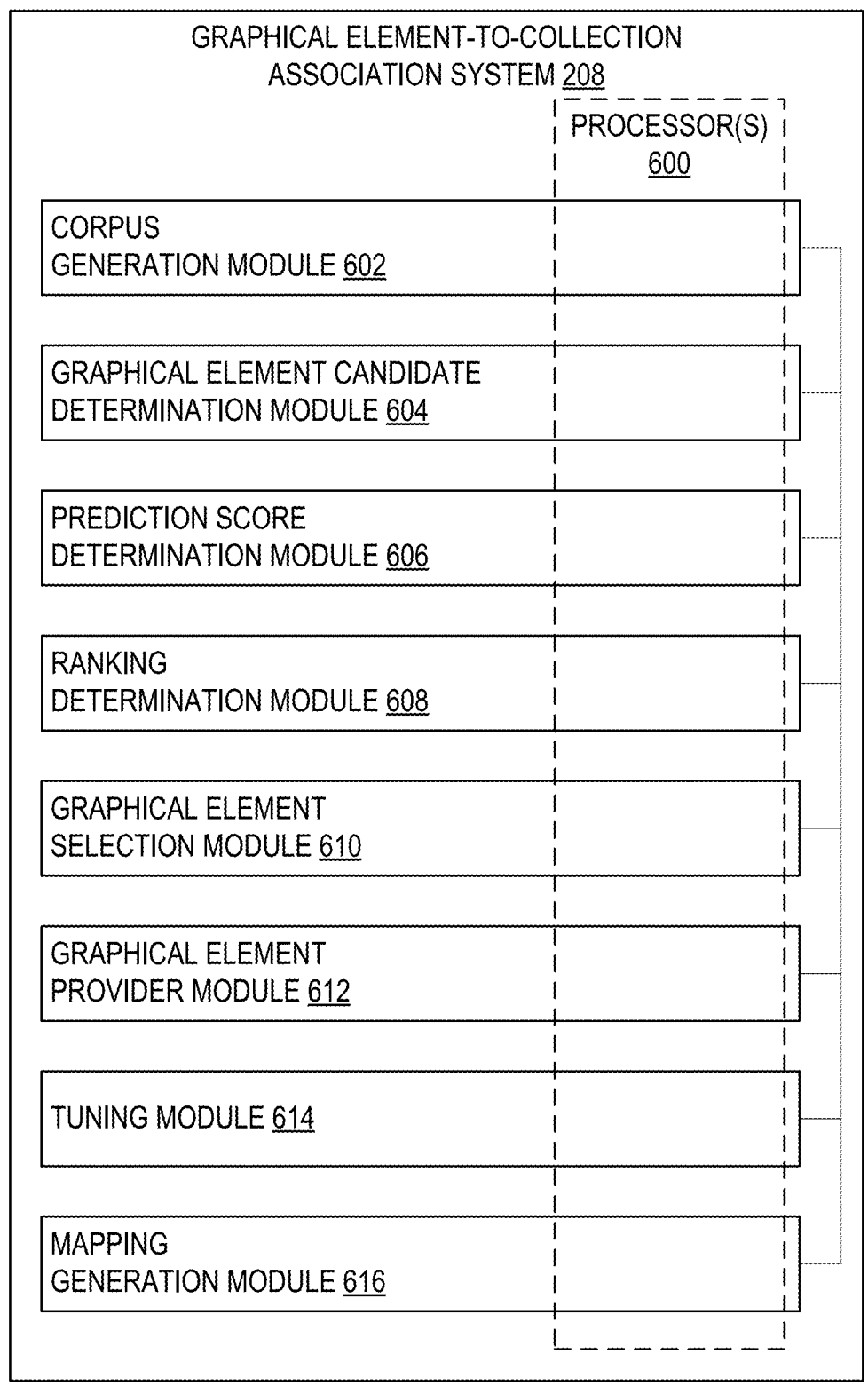
FIG. 6 is a block diagram illustrating various modules of a graphical element-to-collection association system, according to some embodiments.

FIG. 6 is a block diagram illustrating various modules of the graphical element-to-collection association system 208, according to some embodiments. The graphical element-to-collection association system 208 is shown as including a corpus generation module 602, a graphical element candidate determination module 604, a prediction score determination module 606, a ranking determination module 608, a graphical element selection module 610, a graphical element provider module 612, a tuning module 614, and a mapping generation module 616. The various modules of the graphical element-to-collection association system 208 are configured to communicate with each other (e.g., via a bus, shared memory, or a switch). Any one or more of these modules may be implemented using one or more processors 600 (e.g., by configuring such one or more processors 600 to perform functions described for that module) and hence may include one or more of the processors 600.

Any one or more of the modules described may be implemented using hardware alone (e.g., one or more of the computer processors of a machine, such as machine 1100) or a combination of hardware and software. For example, any described module of the graphical element-to-collection association system 208 may physically include an arrangement of one or more of the processors 600 (e.g., a subset of or among the one or more processors of the machine, such the machine 1100) configured to perform the operations described herein for that module. As another example, any module of the graphical element-to-collection association system 208 may include software, hardware, or both, that configure an arrangement of one or more processors 600 (e.g., among the one or more processors of the machine, such as the machine 1100)) to perform the operations described herein for that module. Accordingly, different modules of the graphical element-to-collection association system 208 may include and configure different arrangements of such processors 600 or a single arrangement of such processors 600 at different points in time. Moreover, any two or more modules of the graphical element-to-collection association system 208 may be combined into a single module, and the functions described herein for a single module may be subdivided among multiple modules. Furthermore, according to various embodiments, modules described herein as being implemented within a single machine, database, or device may be distributed across multiple machines, databases, or devices.

The corpus generation module 602 generates corpus data from a set of features of a collection of media content items, the corpus data comprising a set of n-grams identified in the set of features, a given n-gram in the set of n-grams comprising at least one of a term or a graphical element. In particular, for some embodiments, the corpus generation module 602 identifies (e.g., all) terms, words, and graphical elements found in features of the collection, such as a caption of the collection, a graphical element (e.g., emoji) present in the collection, a visual label identifying an object depicted in a media content item of the collection, or a category associated with the collection (e.g., sports event, concert, fashion show, animals story, etc.). The corpus generation module 602 may combine the identified terms, words, and graphical elements into a single corpus, which can be described by the corpus data. In particular, the corpus data generated by the corpus generation module 602 may describe each unique n-gram (e.g., unigram, bigram, trigram, etc.) found in the single corpus. Additionally, the corpus generation module 602 can generate a frequency probability score for each unique n-gram found in the single corpus. The frequency probability score may be represented as a single count of times a unique n-gram appears in the single corpus.

The graphical element candidate determination module 604 determines a set of candidate graphical elements for the collection of media content items based on the corpus data generated by the corpus generation module 602, and further based on at least one graphical element mapping. Examples of graphic element mappings may include, without limitation: a set of mappings associating at least one graphical element and at least one n-gram (e.g., emoji-to-word mapping); a set of mappings associating two or more graphical elements together (e.g., emoji-to-emoji mapping synonyms); and a set of between at least one graphical element and a category associated with a given collection of media content items (e.g., canonical mapping of an emoji-to-collection category). According to some embodiments, the mapping generation module 616 generates one or more graphical element mappings used by the graphical element-to-collection association system 208.

For some embodiments, the graphical element candidate determination module 604 determines the set of candidate graphical elements based on the corpus data by adding any graphical elements described in the corpus data (e.g., identified by the corpus generation module 602 in the features of the collection) to the set of candidate graphical elements.

According to some embodiments, the graphical element candidate determination module 604 determines the set of candidate graphical elements based on the corpus data generated by the corpus generation module 602 and further based on a set of mappings associating at least one graphical element and at least one n-gram (e.g., emoji-to-word mapping). In particular, based on the set of mappings associating at least one graphical element and at least one n-gram, the graphical element candidate determination module 604 may map at least one unique n-gram (e.g., "happy birthday") described in the corpus data to one or more graphical elements (e.g., an emoji depicting a birthday cake), and add those one or more graphical elements to the set of candidate graphical elements. Depending on the embodiment, mapping a unique n-gram to one or more graphical elements may comprise replacing at least a term portion of the unique n-gram (e.g., a word or phrase of the unique n-gram) with the one or more graphical elements according to the set of mappings, thereby producing a modified n-gram that can be added to the candidate graphical elements.

For various embodiments, the graphical element candidate determination module 604 determines, based on the corpus data generated by the corpus generation module 602 and further based on a set of mappings associating two or more graphical elements together (e.g., emoji-to-emoji mapping synonyms). For instance, based on the set of mappings associating two or more graphical elements together, the graphical element candidate determination module 604 may map at least one graphical element (e.g., an emoji depicting a birthday cake) described in the corpus data to one or more graphical element representing synonyms (e.g., an emoji depicting confetti or an emoji depicting a birthday cupcake) to the at least one graphical element, and add those one or more graphical elements to the set of candidate graphical elements.

For some embodiments, the graphical element candidate determination module 604 determines a graphical element based on the corpus data generated by the corpus generation module 602 and further based on a set of mappings between at least one graphical element and a category associated with a given collection of media content items (e.g., canonical mapping of an emoji-to-collection category). For example, the graphical element candidate determination module 604 element candidate may determine a category (e.g., "video games") associated with the collection (e.g., as identified by a feature of the collection), map the collection to one or more graphical elements (e.g., an emoji depicting a game console controller) based on the set of mappings between at least one graphical element and a category associated with a given collection of media content items, and add those one or more graphical elements to the set of candidate graphical elements.

The prediction score determination module 606 determines a set of prediction scores corresponding to the set of candidate graphical elements, determined by the graphical element candidate determination module 604, based on the set of features of the collection of media content items. According to some embodiments, the prediction score determination module 606 determines a prediction score for each graphical element in the set of candidate graphical elements based on corresponding frequency probability scores provided by the corpus data (generated by the corpus generation module 602). The prediction score determination module 606 may generate each prediction score a term frequency-inverse document frequency (TF-IDF) algorithm (e.g., a weighted TF-IDF). For instance, the prediction score determination module 606 may use the following Equation 1:

$$\text{Prediction Score} = \sum_{t \in S} \frac{Ctf * TFt}{Cidf * IDFt},$$

where t represents a particular n-gram or graphical element in the corpus, S represents the corpus of n-grams described by the corpus data generated by the corpus generation module 602, $TF_t$ represents the frequency probability score corresponding to t, $IDF_t$ represents the IDF score for t across the corpus S, and each of $Ct_f$ and $Cid_f$ represents a constant that can be tuned via the tuning module 614.

The ranking determination module 608 determines a ranking for the set of candidate graphical elements, determined by the graphical element candidate determination module 604, based on the set of prediction stores determined by the prediction score determination module 606. In particular, in the set of candidate graphical elements, a graphical element having a higher prediction score may be determined to have a higher rank.

The graphical element selection module 610 selects a set of predicted graphical elements, from the set of candidate graphical elements (determined by the graphical element candidate determination module 604), based on the ranking determined by the ranking determination module 608. In particular, the set of predicted graphical elements selected by the graphical element selection module 610 may be those having the highest rank as determined by the ranking determination module 608.

The graphical element provider module 612 provides the set of predicted graphical elements, selected by the graphical element selection module 610, in association with the collection of media content items. For example, when a collection of media content items is provided for access by a client device associated with a user, the set of predicted graphical elements selected by the graphical element selection module 610 for the collection may also be provided for access with the collection. Alternatively or additionally, the graphical element provider module 612 may store an association between the collection and the set of predicted graphical elements (e.g., store the association in the annotation table 312 or the story table 306 in connection with a collection of messages). The stored association can be subsequently retrieved and used for other operations, such as searching for collections based on one or more graphical elements (e.g., provided in a search query by a user at a client device 102). Further, providing the set of predicted graphical elements in association with the collection of media content items may comprise causing presentation of one or more of the set of predicted graphical elements to a user in connection with the collection of the media content items (e.g., through a graphical user interface (GUI) accessible to the user at a client device).

The tuning module 614 tunes how the prediction score determination module 606 determines a set of prediction scores based on the set of features by adjusting at least one weight (e.g., representing an emoji-to-collection relevance) used by the prediction score determination module 606 in calculating a prediction score for at least one of the graphical elements in the set of candidate graphical elements. According to some embodiments, the tuning module 614 adjusts at least one of constant $Ct_f$ and constant $Cid_f$ of Equation 1 as described above with respect to the prediction score determination module 606. Depending on the embodiment, the tuning module 614 may tune the prediction score determination module 606 by facilitating a manual evaluation by a human individual (e.g., trained human curator) at a client device. In particular, through the tuning module 614, the human individual may be presented with a given collection of media content items as a sequence of captions and with one or more graphical elements (e.g., emojis) extracted from the collection, which the human individual can then review. By the tuning module 614, the human individual may mark or otherwise designate whether a particular extracted graphical element is relevant to the given collection (e.g., on a three-point scale of not relevant, relevant, or highly relevant). Based on this relevancy evaluation, the tuning module 614 can modify the weights used by the prediction score determination module 606 to determine one or more prediction scores for candidate graphical elements. In this way, the tuning module 614 may improve the graphical element-to-collection association system 208's ability (e.g., precision and recall of relevant graphical element associations) to predict graphical elements in the future.

The mapping generation module 616 generates one or more graphical elements mappings that can be used by the graphical element-to-collection association system 208. As noted herein, examples of graphic element mappings can include, without limitation, a set of mappings associating at least one graphical element and at least one n-gram, a set of mappings associating two or more graphical elements together, and a set of between at least one graphical element and a category associated with a given collection of media content items.

According to some embodiments, the mapping generation module 616 generates (e.g., mines for) a set of mappings associating at least one graphical element and at least one n-gram based on co-occurrences of the at least one graphical element and the at least one n-gram with respect to (e.g., within) at least one other collection of media content items, such as a corpus of past collections (e.g., past stories, also referred to as historical stories). For example, based on historically observing a graphical element (e.g., emoji) depicting a farmer co-occurring with the term "organic" frequently, the mapping generation module 616 can generate a graphical element-to-n-gram mapping with a certain weight between "organic" and the graphical element depicting the farmer.

For some embodiments, the mapping generation module 616 determines n-grams that commonly co-occur with graphical elements (e.g., emojis) across a corpus of past collections using a normalized pointwise mutual information (NPMI) algorithm. In particular, first the mapping generation module 616 may generate inverse document frequency (IDF) scores for each graphical element (e.g., emoji) and n-gram (e.g., term) in the corpus of past collections. These can measure how often graphical elements and n-grams (e.g., terms) appear in the corpus of past collections as a whole, thereby permitting the mapping generation module 616 to identify n-grams (e.g., terms) that are frequently used in past collections versus n-grams (e.g., terms) that are uniquely related to the collection at hand. Each IDF score may be represented as a simple probability p(x). Subsequently, the mapping generation module 616 may determine a weight of the graphical element-to-n-gram mappings using a normalized pointwise mutual information (NPMI) algorithm, where p(x) is the probability of a n-gram (e.g., term) x appearing in a corpus of past collections, where p(y) is the probability of a graphical element (e.g., emoji) y appearing in a corpus of past collections, and p(x,y) is the probability of n-gram x and graphical element y co-occurring in the same document (e.g., media content item) in the corpus. The mapping generation module 616 may determine a weight (e.g., NPMI score) using the following Equation 2 to determine the weight between [−1,1] on the "correlated"-ness of a n-gram x and a graphical element y:

$$npmi(x; y) = \frac{pmi(x, y)}{-\log(p(x, y))},$$

where the Equation 3 defines pmi(x,y) as follows:

$$pmi(x; y) \equiv \log\frac{p(x, y)}{p(x)p(y)},$$

For some embodiments, weights (e.g., NPMI score) are stored in a large scale map data structure, which may permit keys to be rapidly accessed to terms and related graphical elements (e.g., emojis).

According to some embodiments, the mapping generation module 616 generates (e.g., mines for) a set of mappings associating at least one graphical element and at least one n-gram based on data that provides a Unicode standard description for the at least one graphical element. For instance, based on the Unicode standard description associated with the Unicode emoji depicting a male farmer (U+1F468 U+200D U+1F33E), the mapping generation module 616 may associate the graphical element with the terms (e.g., {farmer|gardener|man|rancher}) extracted or matched against from the Unicode standard description.

According to some embodiments, the mapping generation module 616 generates (e.g., mines for) a set of mappings associating two or more graphical elements together. In particular, the mapping generation module 616 may generate the set of mappings associating two or more graphical elements together based a set of mappings associating the at least one graphical element and the at least one n-gram (e.g., also generated by the mapping generation module 616). A set of mappings associating two or more graphical elements together may, for example, map emojis to one or more synonymous emoji. For instance, with respect to graphical elements meant to represent a Halloween party (e.g., an emoji depicting a jack-o-lantern and another emoji depicting a party favor), the mapping generation module 616 can learn that a jack-o-lantern graphical element and a party favor graphical element are not synonyms but, rather, combined together represent a similar term. To learn this graphical element-to-graphical element mapping, the mapping generation module 616 may map the jack-o-lantern graphical element and the party favor graphical element back to their respective n-gram representations (e.g., {halloween, halloween party, pumpkin, jack o'lantern} for the jack-o-lantern graphical element and {party, celebration, birthday party, halloween party} for the party favor graphical element) using the set of mappings associating at least one graphical element to at least one n-gram. The mapping generation module 616 may then map the resulting n-grams back to the synonym emojis (e.g., {halloween, halloween party, pumpkin, jack o'lantern} can map to can map to synonym graphical elements representing a party favor, a ghost, and a demon; and {party, celebration, birthday party, halloween party} can map to synonym graphical elements representing a party favor, a present, a jack-o-lantern, and a ghost) using the set of mappings associating at least one graphical element to at least one n-gram. The set of mappings associating two or more graphical elements together may also be designed to preserve high-value modifiers for emojis (e.g. skin tone) by using compound terms in the mappings (e.g. "tone1-woman").

According to some embodiments, the mapping generation module 616 generates a set of between at least one graphical element and a category associated with a given collection of media content items. In particular, the mapping generation module 616 may permit a user at a client device to establish a canonical mapping between a graphical element and a collection category based on analysis or observation of prior collections, such as observing that a particular graphical element represents a particular collection category well.

Figure 7:
FIG. 7 illustrates examples graphical element mappings, according to some embodiments.

FIG. 7 illustrates examples graphical element mappings, according to some embodiments. In particular, mapping 702 represents an example graphical element-to-n-gram mapping, and mapping 704 represents an example graphical element-to-graphical element mapping. One or more of the mappings 702, 704 may be generated by the mapping generation module 616 or used by the graphical element candidate determination module 604. Table 706 represents an example of data generated and stored by the graphical element-to-collection association system 208 during its operation as described herein. In particular, column emoji provides the emoji in question, column score provides the score calculated by the prediction score determination module 606 for the emoji in question, column tf provides a frequency probability score corresponding to the emoji in question, column idf provides an IDF score for the emoji, column caps provides a number of captions that include the emoji in question, column sim_terms provides one or more terms that relate to the emoji in question, and column rm_sim_emoji provides one or more emojis similar (e.g., synonyms) to the emoji in question.

Figure 8:
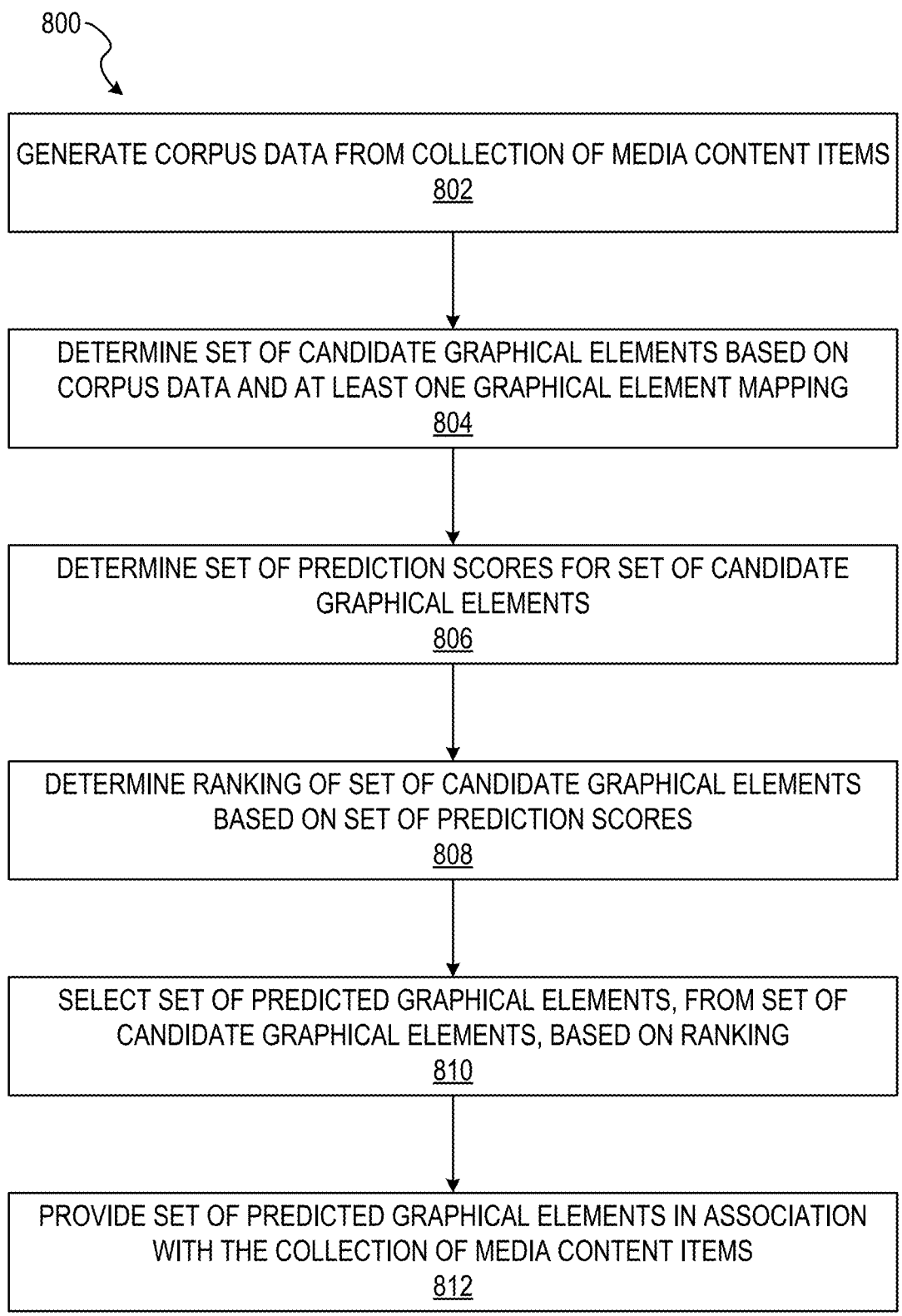
FIGS. 8 and 9 are flowcharts illustrating methods for associating a collection of media items with a graphical element, according to certain embodiments.

FIG. 8 is a flowchart illustrating a method 800 for associating a collection of media items with a graphical element, according to certain embodiments. The method 800 may be embodied in computer-readable instructions for execution by one or more computer processors such that the operations of the method 800 may be performed in part or in whole by the messaging server system 108 or, more specifically, the graphical element-to-collection association system 208 of the messaging server application 114. Accordingly, the method 800 is described below by way of example with reference to the graphical element-to-collection association system 208. At least some of the operations of the method 800 may be deployed on various other hardware configurations, and the method 800 is not intended to be limited to being operated by the messaging server system 108. Though the steps of method 800 may be depicted and described in a certain order, the order in which the steps are performed may vary between embodiments. For example, a step may be performed before, after, or concurrently with another step. Additionally, the components described above with respect to the method 800 are merely examples of components that may be used with the method 800, and other components may also be utilized, in some embodiments.

At operation 802, the corpus generation module 602 generates corpus data from a set of features of a collection of media content items, the corpus data comprising a set of n-grams identified in the set of features, a given n-gram in the set of n-grams comprising at least one of a term or a graphical element. At operation 804, the graphical element candidate determination module 604 determines a set of candidate graphical elements for the collection of media content items based on the corpus data generated by the corpus generation module 602, and further based on at least one graphical elements mapping. At operation 806, the prediction score determination module 606 determines a set of prediction scores corresponding to the set of candidate graphical elements, determined by the graphical element candidate determination module 604, based on the set of features of the collection of media content items. At operation 808, the ranking determination module 608 determines a ranking for the set of candidate graphical elements, determined by the graphical element candidate determination module 604, based on the set of prediction stores determined by the prediction score determination module 606. At operation 810, the graphical element selection module 610 selects a set of predicted graphical elements, from the set of candidate graphical elements (determined by the graphical element candidate determination module 604), based on the ranking determined by the ranking determination module 608. At operation 812, the graphical element provider module 612 provides the set of predicted graphical elements, selected by the graphical element selection module 610, in association with the collection of media content items.

Figure 9:
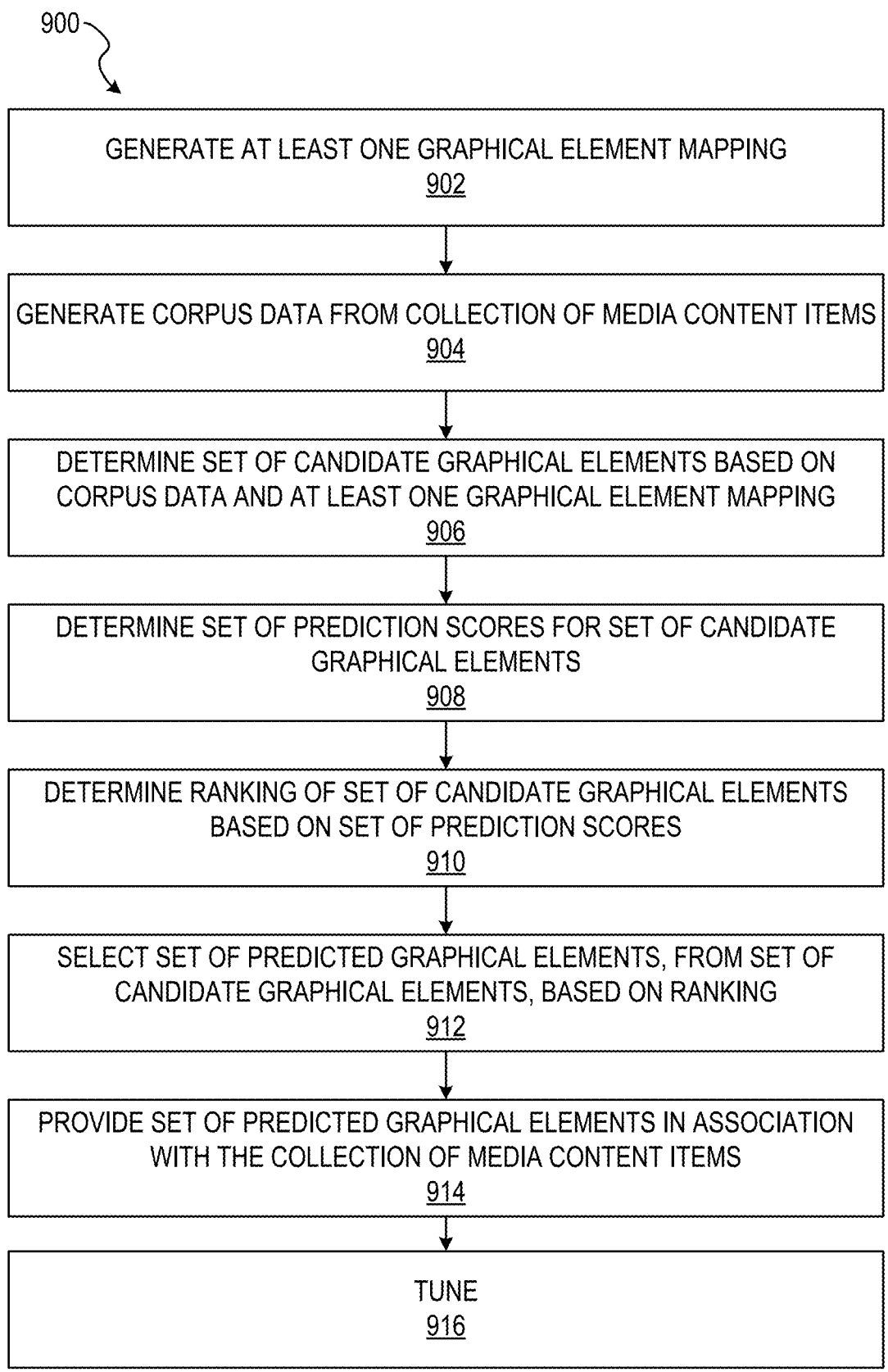

FIG. 9 is a flowchart illustrating a method 900 for associating a collection of media items with a graphical element, according to certain embodiments. The method 900 may be embodied in computer-readable instructions for execution by one or more computer processors such that the operations of the method 900 may be performed in part or in whole by the messaging server system 108 or, more specifically, the graphical element-to-collection association system 208 of the messaging server application 114. Accordingly, the method 900 is described below by way of example with reference to the graphical element-to-collection association system 208. At least some of the operations of the method 900 may be deployed on various other hardware configurations, and the method 900 is not intended to be limited to being operated by the messaging server system 108. Though the steps of method 900 may be depicted and described in a certain order, the order in which the steps are performed may vary between embodiments. For example, a step may be performed before, after, or concurrently with another step. Additionally, the components described above with respect to the method 900 are merely examples of components that may be used with the method 900, and that other components may also be utilized, in some embodiments.

At operation 902, the mapping generation module 616 generates one or more graphical element mappings that can be used by the graphical element-to-collection association system 208. For some embodiments, operations 904 through 914 are respectively similar to operations 802 through 812 of the method 800 described above with respect to FIG. 8. At operation 916, the tuning module 614 tunes how the prediction score determination module 606 determines a set of prediction scores based on the set of features by adjusting at least one weight (e.g., representing an emoji-to-collection relevance) used by the prediction score determination module 606 in calculating a prediction score.

Figure 10:
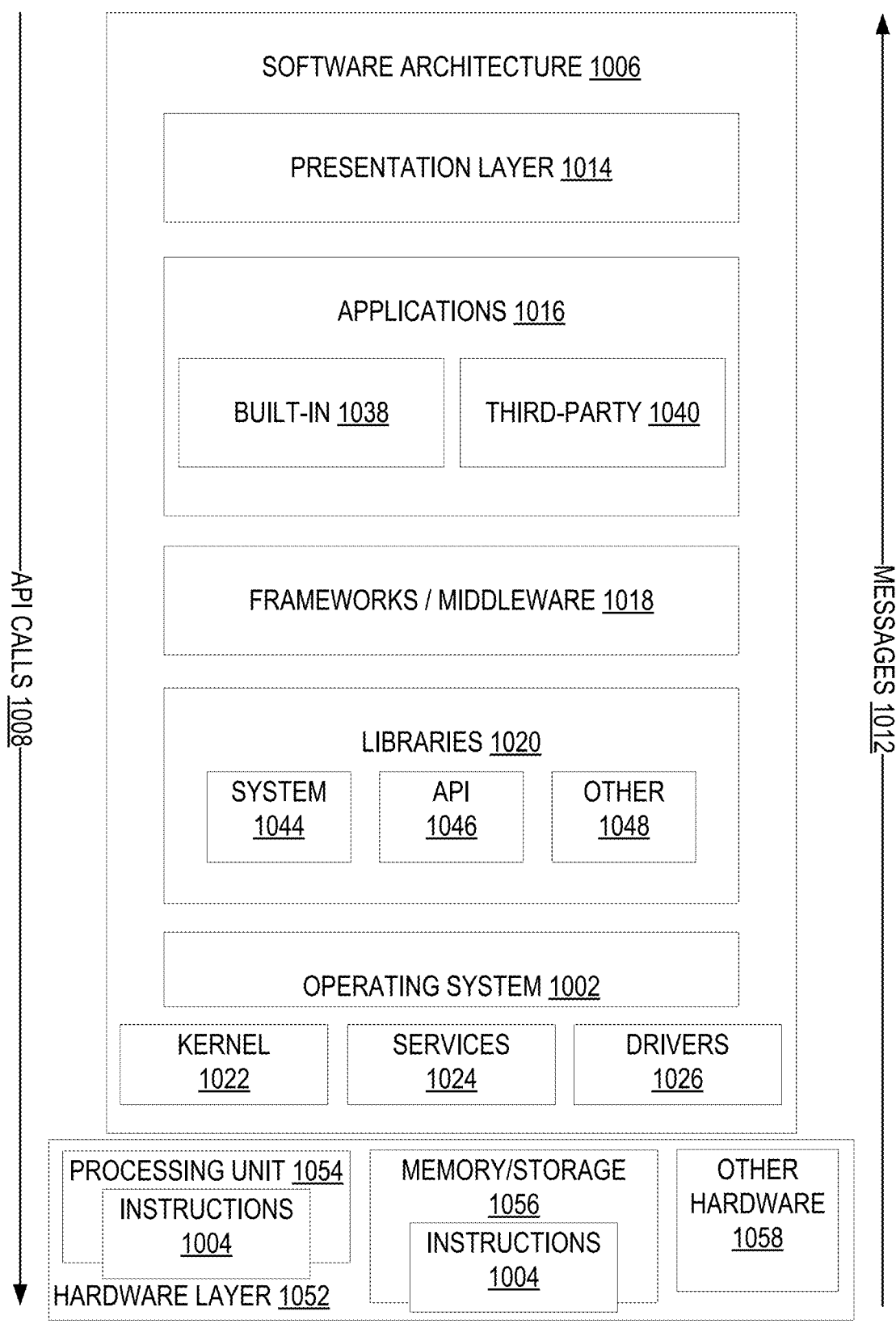
FIG. 10 is a block diagram illustrating a representative software architecture, which may be used in conjunction with various hardware architectures herein described.

FIG. 10 is a block diagram illustrating an example software architecture 1006, which may be used in conjunction with various hardware architectures herein described. FIG. 10 is a non-limiting example of a software architecture and it will be appreciated that many other architectures may be implemented to facilitate the functionality described herein. The software architecture 1006 may execute on hardware such as machine 1100 of FIG. 11 that includes, among other things, processors 1104, memory/storage 1106, and I/O components 1118. A representative hardware layer 1052 is illustrated and can represent, for example, the machine 1100 of FIG. 11. The representative hardware layer 1052 includes a processing unit 1054 having associated executable instructions 1004. Executable instructions 1004 represent the executable instructions of the software architecture 1006, including implementation of the methods, components and so forth described herein. The hardware layer 1052 also includes memory or storage modules memory/storage 1056, which also have executable instructions 1004. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, applications 1016, and a presentation layer 1014. Operationally, the applications 1016 or other components within the layers may invoke application programming interface (API) calls 1008 through the software stack and receive a response in the example form of messages 1012 to the API calls 1008. The layers illustrated are representative in nature and not all software architectures have all layers. For example, some mobile or special purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024 and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 or other components or layers. The libraries 1020 provide functionality that allows other software components to perform tasks in an easier fashion than to interface directly with the underlying operating system 1002 functionality (e.g., kernel 1022, services 1024, or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 (also sometimes referred to as middleware) provide a higher-level common infrastructure that may be used by the applications 1016 or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be used by the applications 1016 or other software components/modules, some of which may be specific to a particular operating system 1002 or platform.

The applications 1016 include built-in applications 1038 or third-party applications 1040. Examples of representative built-in applications 1038 may include, but are not limited to, a contacts application, a browser application, a book reader application, a location application, a media application, a messaging application, or a game application. Third-party applications 1040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1040 may invoke the API calls 1008 provided by the mobile operating system (such as operating system 1002) to facilitate functionality described herein.

The applications 1016 may use built-in operating system functions (e.g., kernel 1022, services 1024, or drivers 1026), libraries 1020, and frameworks/middleware 1018 to create user interfaces to interact with users of the system. Alternatively, or additionally, in some systems, interactions with a user may occur through a presentation layer, such as presentation layer 1014. In these systems, the application/component "logic" can be separated from the aspects of the application/component that interact with a user.

Figure 11:
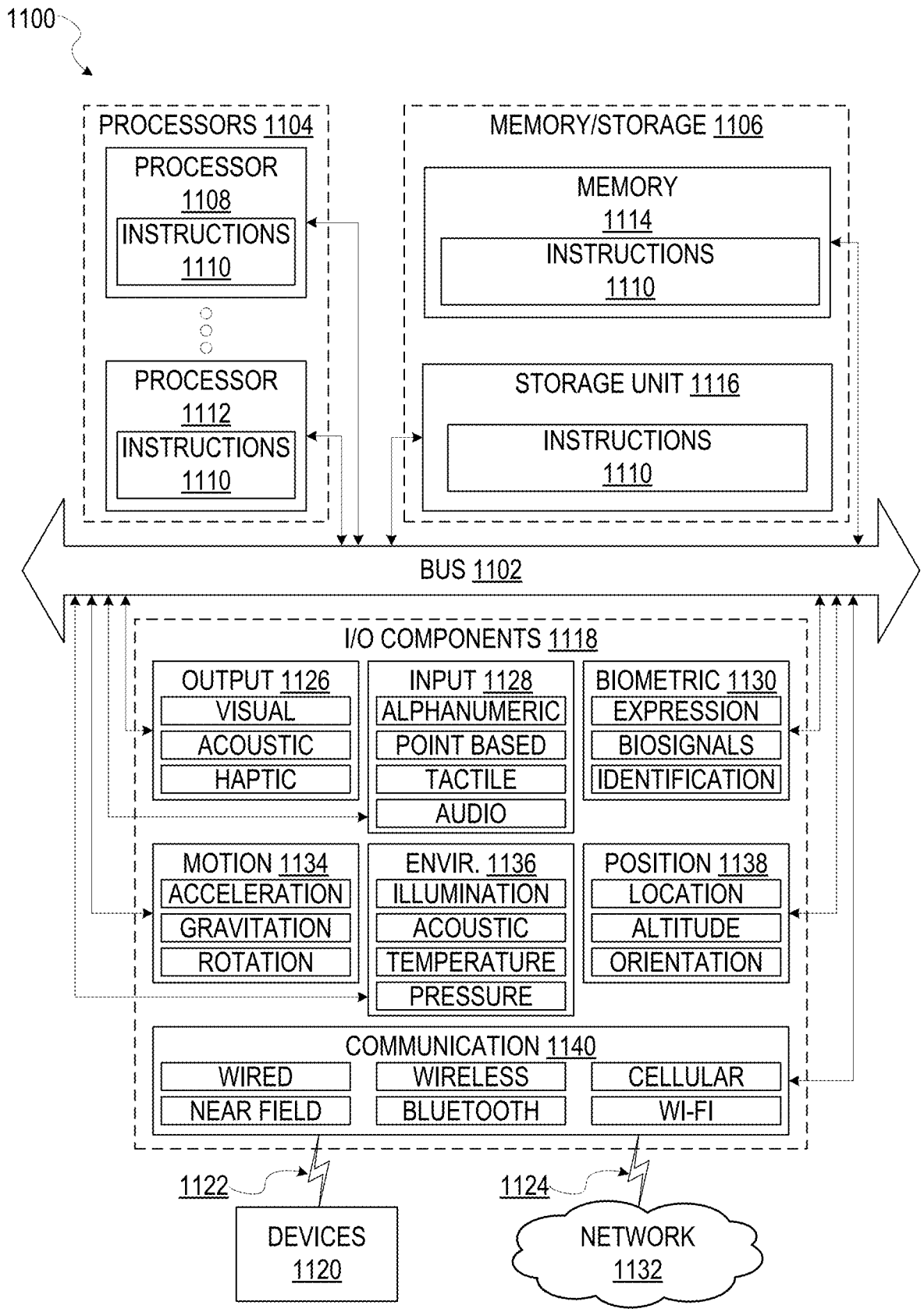
FIG. 11 is a block diagram illustrating components of a machine, according to some embodiments, able to read instructions from a machine-readable medium (e.g., a machine-readable storage medium) and perform any one or more of the methodologies discussed herein.

FIG. 11 is a block diagram illustrating components of a machine 1100, according to some embodiments, able to read instructions from a machine-readable medium (e.g., a computer-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of processors 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further embodiments, the I/O components 1118 may include biometric components 1130, motion components 1134, environment components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via coupling 1122 and coupling 1124 respectively. For example, the communication components 1140 may include a network interface component or other suitable device to interface with the network 1132. In further examples, communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a Universal Serial Bus (USB)).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as, location via Internet Protocol (IP) geo-location, location via Wi-Fi® signal triangulation, location via detecting a NFC beacon signal that may indicate a particular location, and so forth.

As used herein, "ephemeral message" can refer to a message (e.g., message item) that is accessible for a time-limited duration (e.g., maximum of 11 seconds). An ephemeral message may comprise a text content, image content, audio content, video content and the like. The access time for the ephemeral message may be set by the message sender or, alternatively, the access time may be a default setting or a setting specified by the recipient. Regardless of the setting technique, an ephemeral message is transitory. A message duration parameter associated with an ephemeral message may provide a value that determines the amount of time that the ephemeral message can be displayed or accessed by a receiving user of the ephemeral message. An ephemeral message may be accessed or displayed using a messaging client software application capable of receiving and displaying content of the ephemeral message, such as an ephemeral messaging application.

As also used herein, "ephemeral message story" can refer to a collection of ephemeral message content items that is accessible for a time-limited duration, similar to an ephemeral message. An ephemeral message story may be sent from one user to another, and may be accessed or displayed using a messaging client software application capable of receiving and displaying the collection of ephemeral message content items, such as an ephemeral messaging application.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various embodiments, one or more computer systems or one or more hardware modules thereof may be configured by software (e.g., an application or portion thereof) as a hardware module that operates to perform operations described herein for that module.

In some embodiments, a hardware module may be implemented electronically. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor.

Considering embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, described hardware modules may be regarded as being communicatively coupled. Where multiple hardware modules exist contemporaneously, communications may be achieved through signal transmission (e.g., over suitable circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
   generating, by one or more processors, corpus data from a set of features of a collection of media content items, the corpus data comprising a set of textual n-grams identified in the set of features;
   determining, by the one or more processors, a set of candidate graphical elements for the collection of media content items based on the set of textual n-grams from the corpus data, based on a set of first mappings that maps at least one textual n-gram in the set of textual n-grams to a first graphical element, and based on a set of second mappings that maps at least the first graphical element to a second graphical element, the second graphical element being determined to be one candidate graphical element in the set of candidate graphical elements;
   determining, by the one or more processors, a set of prediction scores corresponding to the set of candidate graphical elements based on the set of features of the collection of media content items;
   selecting, by the one or more processors, a set of predicted graphical elements, from the set of candidate graphical elements, based on the set of prediction scores; and
   providing, by the one or more processors, the set of predicted graphical elements in association with the collection of media content items.

2. The method of claim 1, wherein the set of candidate graphical elements includes at least one of an emoticon or an emoji.

3. The method of claim 1, further comprising:
   tuning, by the one or more processors, the determining the set of prediction scores based on the set of features by adjusting at least one weight used in calculating a prediction score for at least one graphical element in the set of candidate graphical elements.

4. The method of claim 1, wherein the set of features further comprises at least one of a caption or a particular graphical element associated with the collection of media content items.

5. The method of claim 1, further comprising:
   generating, by the one or more processors, the set of first mappings that maps the at least one textual n-gram in the set of textual n-grams to a first graphical element based on data that provides a Unicode standard description for the first graphical element.

6. The method of claim 1, further comprising:
   generating, by the one or more processors, the set of first mappings that maps the at least one textual n-gram in the set of textual n-grams to a first graphical element based on co-occurrences of the first graphical element and the at least one textual n-gram with respect to at least one other collection of media content items.

7. The method of claim 1, wherein the set of second mappings maps two or more graphical elements together.

8. The method of claim 7, further comprising:
   generating, by the one or more processors, the set of second mappings mapping two or more graphical elements together based on the set of first mappings that maps the at least one textual n-gram in the set of textual n-grams to a first graphical element.

9. The method of claim 7, wherein the determining the set of candidate graphical elements based on the corpus data and further based on the set of first mappings and the set of second mappings comprises replacing at least a graphical element portion of a particular textual n-gram, in the set of textual n-grams, with a particular graphical element according to the set of second mappings to produce a modified textual n-gram, the set of candidate graphical elements including the modified textual n-gram.

10. The method of claim 1, wherein the determining the set of candidate graphical elements based on the corpus data and further based on the set of first mappings comprises replacing at least a term portion of a particular textual n-gram, in the set of textual n-grams, with a particular graphical element according to the set of first mappings to produce a modified textual n-gram, the set of candidate graphical elements including the modified textual n-gram.

11. The method of claim 1, wherein the corpus data further comprises a set of frequency probability scores corresponding to the set of textual n-grams.

12. The method of claim 11, wherein the determining the set of prediction scores corresponding to the set of candidate graphical elements based on the set of features comprises using a term frequency-inverse document frequency (TF-IDF) algorithm to determine the set of prediction scores based on the set of frequency probability scores from the corpus data.

13. A system comprising:
   one or more processors; and
   one or more machine-readable mediums storing instructions that, when executed by the one or more processors, cause the system to perform operations comprising:
   generating corpus data from a set of features of a collection of media content items, the corpus data comprising a set of textual n-grams identified in the set of features;
   determining a set of candidate graphical elements for the collection of media content items based on the set of textual n-grams from the corpus data, based on a set of first mappings that maps at least one textual n-gram in the set of textual n-grams to a first graphical element, and based on a set of second mappings that maps at least the first graphical element to a second graphical element, the second graphical element being determined to be one candidate graphical element in the set of candidate graphical elements;
   determining a set of prediction scores corresponding to the set of candidate graphical elements based on the set of features of the collection of media content items;
   selecting a set of predicted graphical elements, from the set of candidate graphical elements, based on the set of prediction scores; and providing the set of predicted graphical elements in association with the collection of media content items.

14. The system of claim 13, wherein the set of candidate graphical elements includes at least one of an emoticon or an emoji.

15. The system of claim 13, wherein the operations further comprise:
tuning the determining the set of prediction scores based on the set of features by adjusting at least one weight used in calculating a prediction score for at least one graphical element in the set of candidate graphical elements.

16. The system of claim 13, wherein the set of features further comprises at least one of a caption or a particular graphical element associated with the collection of media content items.

17. The system of claim 13, wherein the operations further comprise:
generating the set of first mappings that maps the at least one textual n-gram in the set of textual n-grams to a first graphical element based on data that provides a Unicode standard description for the first graphical element.

18. The system of claim 13, wherein the operations further comprise:
generating the set of first mappings that maps the at least one textual n-gram in the set of textual n-grams to a first graphical element based on co-occurrences of the first graphical element and the at least one textual n-gram with respect to at least one other collection of media content items.

19. The system of claim 13, wherein the set of second mappings maps two or more graphical elements together.

20. A non-transitory computer-readable medium storing instructions that, when executed by one or more computer processors, cause the one or more computer processors to perform operations comprising:

generating corpus data from a set of features of a collection of media content items, the corpus data comprising a set of textual n-grams identified in the set of features;

determining a set of candidate graphical elements for the collection of media content items based on the set of textual n-grams from the corpus data, based on a set of first mappings that maps at least one textual n-gram in the set of textual n-grams to a first graphical element, and based on a set of second mappings that maps at least the first graphical element to a second graphical element, the second graphical element being determined to be one candidate graphical element in the set of candidate graphical elements;

determining a set of prediction scores corresponding to the set of candidate graphical elements based on the set of features of the collection of media content items;

selecting a set of predicted graphical elements, from the set of candidate graphical elements, based on the set of prediction scores; and providing the set of predicted graphical elements in association with the collection of media content items.

* * * * *

UNITED STATES PATENT AND TRADEMARK OFFICE
CERTIFICATE OF CORRECTION

PATENT NO. : 11,604,819 B2
APPLICATION NO. : 17/249336
DATED : March 14, 2023
INVENTOR(S) : Al Majid et al.

It is certified that error appears in the above-identified patent and that said Letters Patent is hereby corrected as shown below:

In the Claims

In Column 28, Line 12, Claim 8, delete "mapping" and insert --maps-- therefor

Signed and Sealed this
Fourth Day of June, 2024

Katherine Kelly Vidal
*Director of the United States Patent and Trademark Office*